United States Patent [19]
Swanson

[11] Patent Number: 5,867,558
[45] Date of Patent: Feb. 2, 1999

[54] METHOD FOR REMOTE COLLECTION OF SIGNALING MESSAGES FOR ROUTING ANALYSIS AND TROUBLE DETECTION

[75] Inventor: Robert Allen Swanson, Naperville, Ill.

[73] Assignee: AT&T Corp., Middletown, N.J.

[21] Appl. No.: 923,498

[22] Filed: Sep. 4, 1997

Related U.S. Application Data

[63] Continuation of Ser. No. 570,879, Dec. 12, 1995.

[51] Int. Cl.[6] .............................. H04M 1/24; H04M 3/08; H04M 3/22
[52] U.S. Cl. ................................. 379/34; 379/1; 379/12; 379/16; 379/23
[58] Field of Search .............................. 379/1–2, 5, 9–10, 379/12–15, 27, 29, 30, 33–34, 219, 229, 230, 16, 17, 22, 24

[56] References Cited

U.S. PATENT DOCUMENTS

| | | | |
|---|---|---|---|
| 4,464,543 | 8/1984 | Kline et al. ................................ | 379/34 |
| 5,008,929 | 4/1991 | Olsen et al. ............................. | 379/112 |
| 5,297,193 | 3/1994 | Bouix et al. .............................. | 379/63 |
| 5,426,688 | 6/1995 | Anand .......................................... | 379/5 |
| 5,440,626 | 8/1995 | Boyle et al. ............................. | 379/219 |
| 5,579,371 | 11/1996 | Aridas et al. ............................. | 379/34 |
| 5,757,895 | 5/1998 | Aridas et al. ............................. | 379/34 |

*Primary Examiner*—Curtis A. Kuntz
*Assistant Examiner*—Binh K. Tieu
*Attorney, Agent, or Firm*—Robert B. Levy

[57] ABSTRACT

A method for monitoring the signaling network in a telecommunication system comprises extending a copy of each signaling message processed by a particular signal transfer point to an interface unit. The interface unit relays "of interest" messages to a signal monitoring system (SMS) in accordance with a pre-determined filtering protocol. In the SMS, messages are correlated in accordance with a pre-defined correlating protocol. The correlated signaling messages are subsequently retrieved by an OSS technician for analysis and updates.

4 Claims, 2 Drawing Sheets

METHOD FOR REMOTE COLLECTION OF SIGNALING MESSAGES FOR ROUTING ANALYSIS AND TROUBLE DETECTION

This application is a continuation of application Ser. No. 08/570,879, filed on Dec. 12, 1995.

TECHNICAL FIELD

This invention relates to telecommunications networks, and more particularly, to a method for selectively monitoring signaling messages relayed via a common channel signaling (CCS) system for controlling the establishment of call connections in such telecommunications networks.

BACKGROUND OF THE INVENTION

The public-switched telephone network (PSTN) comprises: a large number of end switches for serving local subscriber lines and trunks; a smaller number of tandem switches for providing connections between end switches; a large plurality of analog and digital communication paths for interconnecting the end switches, and tandem switches; optional databases for storing information; and a common channel signaling (CCS) system overlay that transmits messages used by the switches for establishing call connections.

The CCS system comprises a plurality of inter-connected signal transfer points (STPs) that transmit messages among network nodes for establishing, managing, and releasing call paths in the PSTN. For identification purposes, each PSTN switch is assigned a discrete "point code" which identifies the switch within the network. Call connections are initiated by call "set-up" messages relayed among network nodes via the CCS system. For example, a two-party call generates several set-up messages including: an initial address message (IAM) formulated by an originating switch (that is, the switch from which the call originates); a line test message; and an answer message. The information contained in call set-up messages is critical for establishing call connections. Therefore, even minor message errors can result in a failed call, which is defined as call for which a network connection to a desired called party is not made. A significant number of failed call connections are the result of erroneous or, undelivered CCS messages.

In existing arrangements, call failure investigation begins after a predetermined number of calls originating from a particular switch over a pre-determined period of time fail, and a "trouble message" is sent by the switch to a maintenance operations support system. A maintenance OSS technician monitors the switch from which the trouble message was received (hereinafter, the "trouble switch"), and reviews a historical record of CCS messages relayed by the trouble switch in an attempt to determine the reasons for call failure. If it appears that the trouble switch is functioning properly, message segments relayed by other network nodes during the unsuccessful call attempts must be obtained directly from those nodes for review and analysis. It is common for a call to generate a substantial number of messages which are relayed to a plurality of network nodes before the call attempt fails. In such cases, the technician must perform the arduous, and error-prone task of retrieval and reconstruction of network signaling messages to determine a cause, and solution for the signaling errors that resulted in call failure.

The inability to easily obtain a network perspective of signaling messages relayed for the establishment of a call connection unduly increases the time required for call failure investigations, and resolutions. Therefore, there is a need in the art for a method and system for efficiently monitoring signaling messages relayed in a network for establishing a call connection.

SUMMARY OF THE INVENTION

This need is addressed and a technical advance is achieved by the method and system of the present invention which provides a network perspective of signaling messages relayed for the establishment of call connections by duplicating all signaling messages processed by a particular signal transfer point for selective retrieval by the maintenance OSS.

In a preferred embodiment of the method of the present invention, all signaling messages relayed by network nodes to establish a call connection are duplicated whether or not call completion fails, and extended to an interface unit by a STP over a high-speed signaling link. The interface unit is initialized with a filtering protocol so that only "of interest" messages are extended to a signal monitoring system (SMS). The SMS uses a customized correlation program to organize messages received from the interface unit in accordance with requirements established by the maintenance operations support system. The correlated messages are extended by the SMS to the maintenance OSS for analysis by a network technician. The filtering and correlating protocols may be altered to serve a specific implementation but a principal use is for call failure analysis.

DETAILED DESCRIPTION

Figure 1:
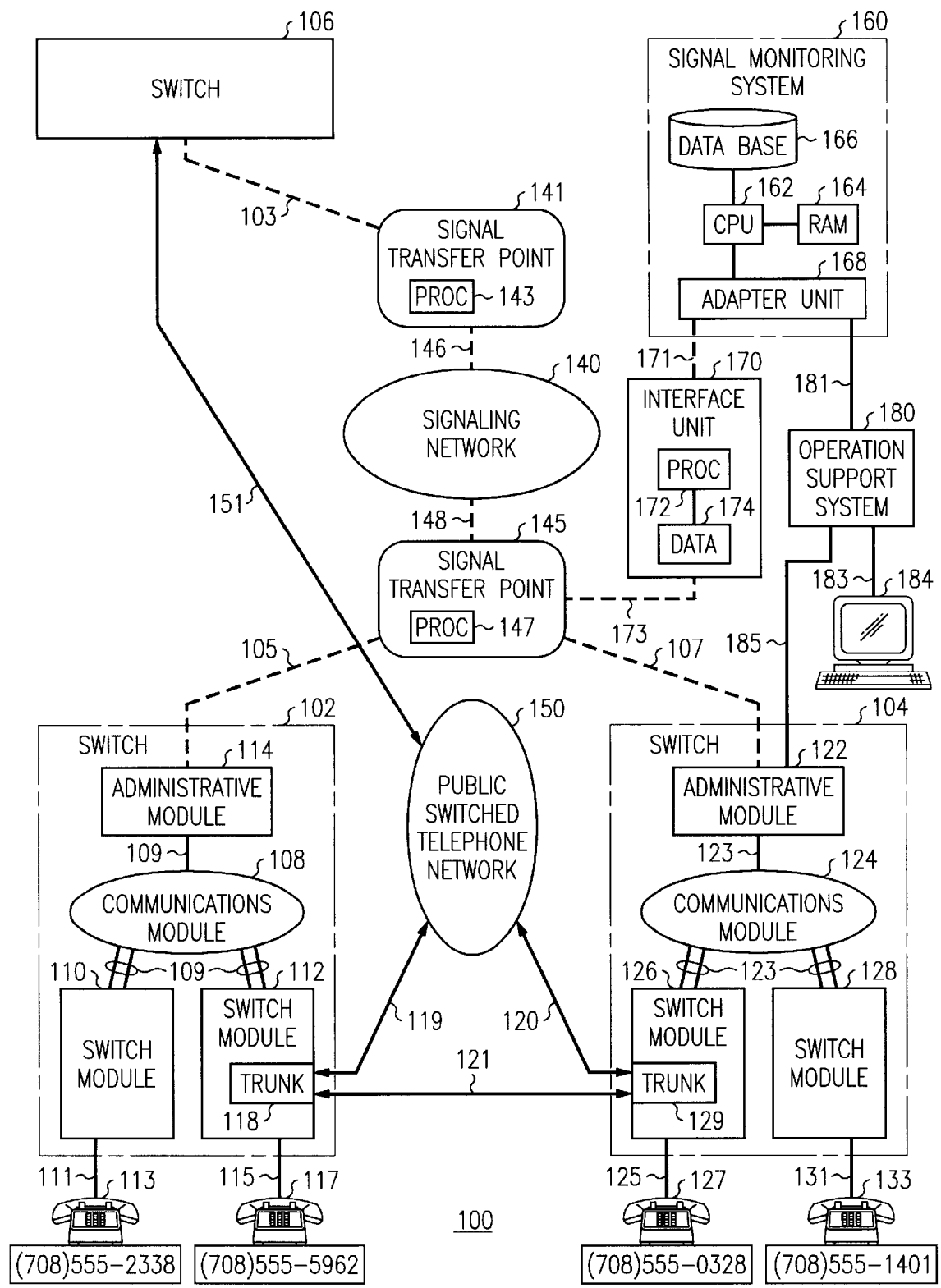
FIG. 1 is a simplified block diagram of a telecommunications system in which the method of present invention may be practiced.

FIG. 1 shows the preferred embodiment of a telecommunications system in which a network perspective of signaling messages relayed for the establishment of call connections can be obtained. Particularly, telecommunications system 100 includes: a plurality of end switches 102, 104, 106 which are a part of, and inter-connected to the rest of public-switched telephone network (PSTN) 150; signal transfer point (STPs) 141, and 145 which are a part of, and are inter-connected to the rest of signaling network 140; signal monitoring system (SMS) 160; and maintenance operation support system (OSS) 180.

In the preferred embodiment, all end switches, including end switch 102, are 5ESS® switches manufactured by AT&T Network Systems. Switch 102 includes three major components: administrative module (AM) 114 for maintenance and control functions; communications module (CM) 108 for relaying messages among switch components; and switch modules (SM) 110 and 112 for interfacing between the switch, and service subscribers. Communication among the various components in the switch is accomplished via network control and timing (NCT) links 109. As convention dictates, dual NCT links are shown between each SM and CM 108.

SM 110 serves a first subscriber via customer line 111 which terminates at telephone 113. In this example, telephone 113 is identified by directory number "708-555-2338". SM 112 serves a second subscriber via customer line 115 terminating at telephone 117 which is identified by the directory number "708-555-5962". SM 112 also includes trunk facility 118 which inter-connects the switch to other network nodes. In this embodiment, trunk facility 118 is shown to be connected to the rest of PSTN 150 by a first bi-directional trunk connection 119 while a second bi-directional trunk connection 121 connects the switch to end switch 104.

Similarly, end switch 104 includes: AM 122 for administering maintenance and control functions; CM 124 for relaying messages among switch components; and switch modules SM 126 and 128. Communication among the various components of switch 104 is accomplished over NCT links 123. Dual NCT links are shown connecting CM 124 and each SM. SM 126 serves a third subscriber via customer line 125 which is inter-connected to telephone 127. Telephone 127 is identified by directory number "708-555-0328". SM 126 also includes trunk facility 129 which interconnects switch 104 to other nodes. As shown, trunk facility 129 is inter-connected to the rest of PSTN 150 by a first bi-directional trunk connection 120 and is inter-connected to switch 102 via bidirectional trunk connection 121. SM 128 serves a fourth subscriber via customer line 131 which is inter-connected to telephone 133. Telephone 133 is identified by directory number "708-555-1401". Since end switch 106 is identical to the other two switches, it is not described in detail.

Signaling network 140 is comprised of a plurality of signal transfer points including STP 141 and STP 145 which are inter-connected to the network by links 146 and 148, respectively. STPs 141 and 145 include duplicating processors 143 and 147, respectively. The STP processors are initialized to duplicate, and extend all messages processed by the STP to a designated interface unit, such as interface unit 170, as described in detail below. In alternative embodiments, processors 143 and 147 are included in a signal duplicator unit (not shown) which is positioned between an STP and a network node on an established signaling link, such as signaling link 107. Messages which pass through the signal duplicator unit are copied and extended over a separate high-speed link which inter-connects the signal duplicator unit to interface unit 170. The signal duplicator unit may also be utilized to extend messages to an interface unit when the messages are relayed between switches without passing through an STP. In such cases, the signal duplicator unit is positioned on a signaling link between the switches. In some operational embodiments, a duplicator processor (or signal duplicator unit) is associated with every STP in the signaling network. Also, is some embodiments, every SMS interface unit may be inter-connected to every STP or signal duplicating unit to allow receipt in the interface unit of all messages relayed in the signaling network. In this embodiment, STP 141 serves end switches 106 via high-speed signaling link 103. End switch 106 is inter-connected to the rest of the PSTN 150 via bi-directional trunk connection 151. STP 145 serves end switches 102 and 104 via high-speed signaling links 105, and 107.

Signal monitoring system (SMS) 160 includes: central processing unit (CPU) 162 for system control; random access memory 164 for storing operating protocols; database 166; and adapter 168 for interacting with external systems. SMS 160 is inter-connected to interface unit 170 via high-speed signaling link 171. Interface unit 170, which comprises system control processor 172, and data memory 174, functions as a programmable filter for signaling messages. Interface unit 170 is controlled by filtering parameters established by a technician, as described below. Also shown is maintenance OSS 180 which is accessed by terminal 184. Terminal 184 is inter-connected to the OSS via data link 183. OSS 180 is also inter-connected to SMS 160 by data link 181, and to switch 104 by link 185.

During operation, a pre-established message parameter is entered by a technician into OSS 180 via terminal 184. One example of a message parameter is "all messages processed by a particular switch", such as switch 104. The entered parameter is received in OSS 180 over data link 183, and is extended by the OSS to SMS 160 via signaling link 181. CPU 162 receives the established parameters via adapter 168, and accesses RAM 164 to formulate a message filtering protocol consistent with the parameter received. Once formulated, the message filtering protocol is downloaded to interface unit 170 over signaling link 171.

For purposes of example, assume that all signaling messages pertaining to calls destined for switch 104 pass through designated STP 145. STP processor 147 is initialized so that each message passing through the transfer point is copied, and extended to interface unit 170 over high-speed link 173. Interface unit 170 executes the filtering protocol so that all "of interest" signaling messages (in this case, the subset of messages includes all messages processed by switch 104) are extended to SMS 160. The "of-interest" signaling messages are received by SMS 160, and stored in database 166. A correlation protocol stored in RAM 164 is utilized to organize the messages in database 166 by pre-established parameters, such as by individual call connections. The messages are retained in database 166 until retrieved by OSS 180. In an alternative embodiment, such as an embodiment in which interface unit 170 is inter-connected to every STP in the signaling network, signaling messages pertaining to switch 104 which are processed by other STPs are also copied and extended to interface unit 170.

The above-mentioned filtering, and correlation protocols may be altered to fit a particular implementation. For example, a filtering parameter which requires the retrieval of messages relating to all calls destined for a particular directory number may be established. Although only a single STP interconnected to an interface unit is shown, operational networks may employ many more interface units, each of which may serve more than one STP.

Figure 2:
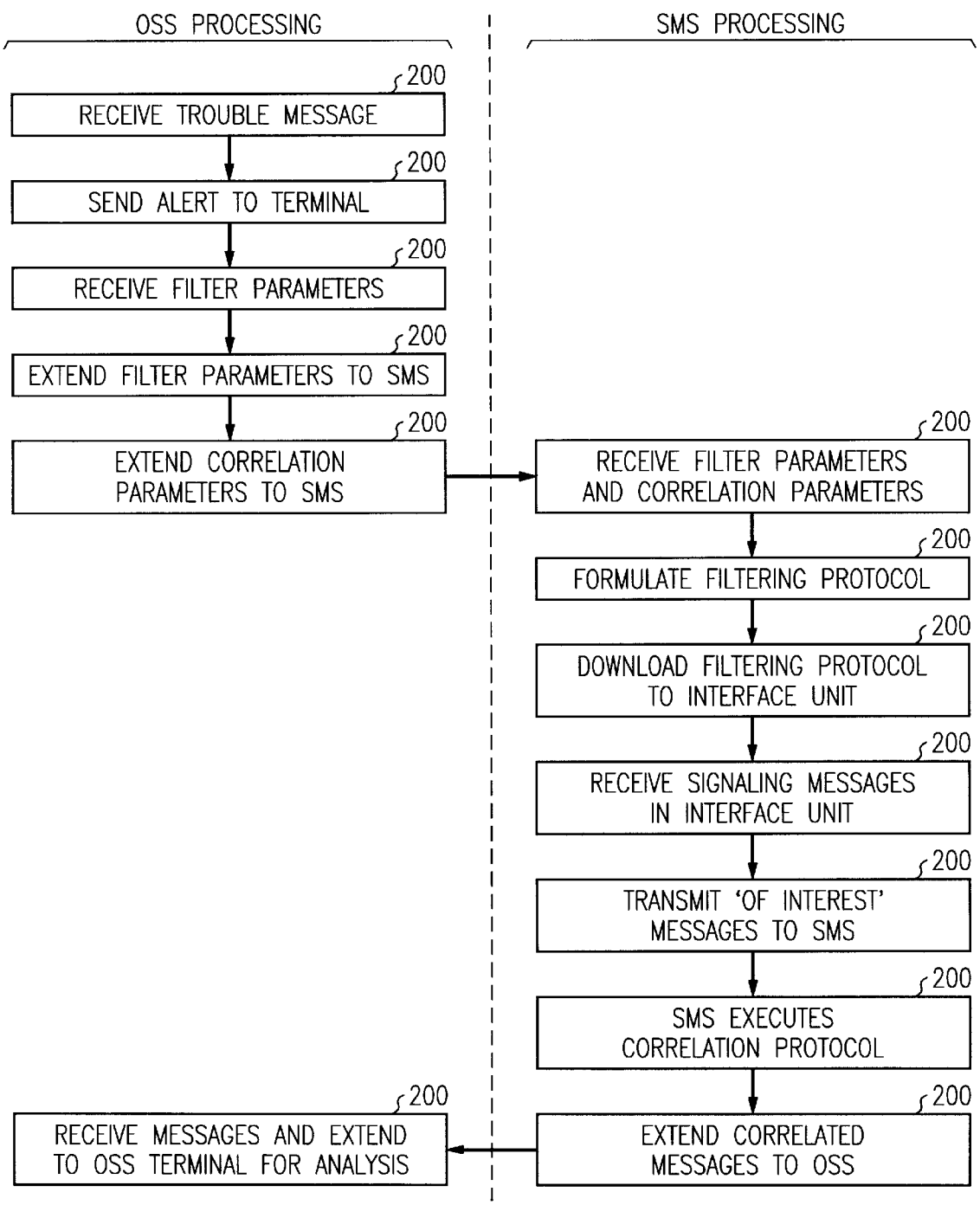
FIG. 2 is a flow diagram of the steps performed in the telecommunications system of FIG. 1 in accordance with the preferred embodiment of the method of the present invention.

FIG. 2 is a flow diagram of the steps performed in telecommunications system 100 in accordance with the preferred embodiment of the method of the present invention divided to show the processing functions of the maintenance OSS and the SMS. For purposes of example, assume that the subscriber associated with the directory number "708-555-1401" (hereinafter, the caller) is unable to establish a call connection with a called party associated with the directory number "708-555-2338". The caller may notify her local service provider (that is, the entity which maintains telecommunications system 100) that she is unable to complete calls to the called party at "708-555-2338". Responsive to the caller's complaint, LEC personnel send a trouble message to OSS 180. Alternatively, the caller's serving switch (i.e. switch 104) may automatically send a trouble message to OSS 180 via message link 185 after a pre-determined number of calls directed to "708-555-2338" which are attempted during a predetermined time period fail. The process begins in step 200 when OSS 180 receives a trouble message indicating a high call failure rate for call attempts initiated by a caller served by directory number "708-555-1401" to a called party at directory number "708-555-2338". In step 202, OSS 180 sends a trouble alert message to terminal 184 via data link 183 for a review by a switch technician. The process continues to step 204 in which signaling message filter parameters are received in OSS 180 from terminal 184. In this example, the message parameters are the set of all messages relating to calls initiated by directory number "708-555-1401" to a called party at directory number "708-555-2338". In step 208, the message filter parameter is extended by OSS 180 to SMS 160 over signaling link 181. In step 210, the message correlation protocol is extended to SMS 160.

The process continues to step 212 in which SMS 160 receives the requested message filter and correlation parameters from OSS 180. In step 214, SMS 160 uses the desired message parameter to formulate a filtering protocol. In this case, all messages relating to a potential call connection between a caller at directory number "708-555-1401" and a called party at directory number "708-555-2338" are deemed to be "of interest", and thus, should be retrieved. In step 216, filtering protocol formulated by SMS 160 is downloaded to interface unit 170 over signaling link 171.

The process continues to step 218 in which interface unit 170 receives all signaling messages processed by signal transfer point, STP 145. STP 145 is also assumed to be the designated signal transfer point which serves the caller's switch although the latter switch could be served by another STP. In step 220, interface unit executes the filtering protocol to identify and transmit "of interest" messages via signaling link 171 to the SMS for storage in database 166. In step 222, SMS 160 executes a correlation protocol to categorize the messages stored in database 166 on a per-call basis. The process continues to step 224, in which the sorted messages are extended to OSS 180 over data link 181. In step 226, the messages are retrieved by a technician for viewing and analysis via terminal 184. If, as a result of the analysis, switch updates are required, OSS 180 may be used to effect switch changes via message link 185.

The present invention facilitates network administration and maintenance by enabling a network-based view of pre-selected signaling messages. Although the preferred embodiment describes a circumstance in which a messages parameter is set in order to investigate messages to determine the cause of call failures, message parameters may set be to farther other objectives. For example, instead of relying on call records which are established only when a call is completed (that is, when the call is answered by the called party) signaling messages relating to attempted calls initiated by a nuisance caller can be monitored to establish calling patterns. Advantageously, the messages establish a calling pattern even if the call is unanswered by the intended called party. Signaling messages may also be generated to allow per-message billing so that STPs may be leased to multiple entities.

While the invention has been particularly illustrated and described with reference to the preferred embodiment above, it is understood that numerous other arrangements, utilizing copies of a large number of messages having common characteristics, may be devised by those skilled in the art without departing from the scope of the invention.

What is claimed is:

1. In a telecommunications network comprising a plurality of switches, and a signaling network including at least one signal transfer point (STP) which serves at least one switch, a method for monitoring signaling messages relayed in the network comprises the steps of:

initializing the STP to duplicate and transmit a copy of each processed signaling message to an interface unit;

filtering signaling messages received in the interface unit in accordance with a pre-established filtering protocol to separate signaling messages "of interest";

extending filtered signaling messages from the interface unit to a signal monitoring system (SMS) for organizing the filtered signaling messages in accordance with a pre-established protocol; and extending the organized signaling messages to a maintenance operation support system (OSS) for signaling analysis, whereby events and conditions are reconstructed for use by the OSS in its analysis.

2. The method of claim 1 and further comprising the step of:

initializing the SMS with the filtering and correlation protocols via the maintenance OSS.

3. The method of claim 1 and further comprising updating a switch in accordance with analysis performed on signaling messages received in the OSS from the SMS.

4. A method of investigating signaling message errors for use in a telecommunications network comprising a plurality of switches served by a plurality of signal transfer points (STPs), wherein a plurality of switches are served by a maintenance operation support system (OSS), comprises the steps of:

interconnecting an interface unit of a signaling monitoring system (SMS) to each STP in the telecommunications network;

receiving in the interface unit a copy of each signaling message processed by the STP to which the interface unit is attached;

utilizing a filtering protocol to extend "of interest" signaling messages received in the interface unit to the signal monitoring system;

the SMS utilizing a correlation protocol to organize of interest signaling messages received from the interface unit in accordance with pre-established correlation parameters; and the SMS extending the organized of interest signaling messages to the maintenance OSS for analysis, whereby events and conditions are reconstructed for use by the OSS in its analysis.

* * * * *